UNITED STATES PATENT OFFICE.

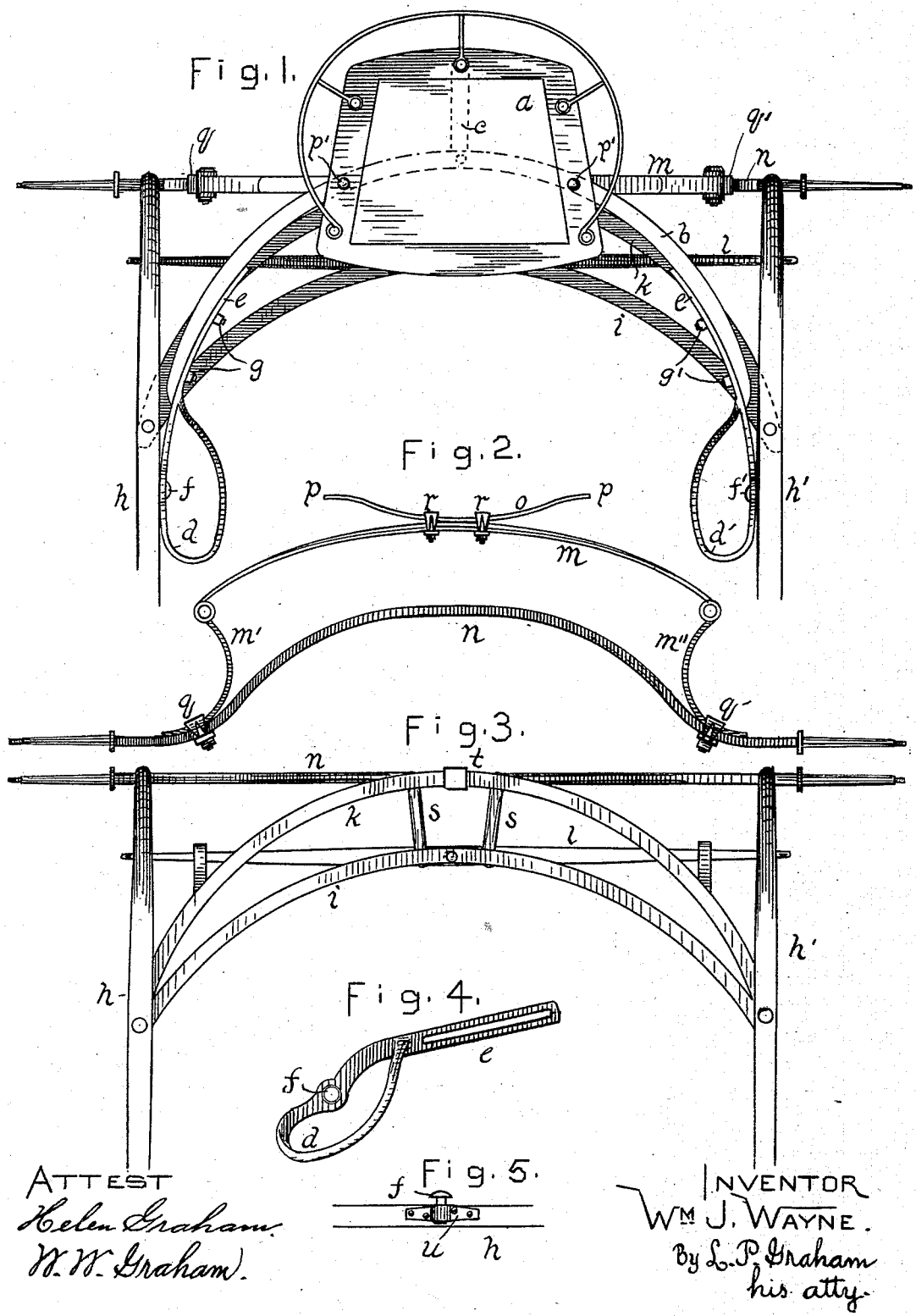

WILLIAM J. WAYNE, OF DECATUR, ILLINOIS.

TWO-WHEELED VEHICLE.

SPECIFICATION forming part of Letters Patent No. 410,224, dated September 3, 1889.

Application filed February 15, 1889. Serial No. 299,953. (No model.)

*To all whom it may concern:*

Be it known that I, WILLIAM J. WAYNE, of the city of Decatur, county of Macon, and State of Illinois, have invented certain new and useful Improvements in Two-Wheeled Vehicles, of which the following is a specification.

It is the object of my invention to produce a two-wheeled vehicle that will combine the desirable qualities of the road-cart and of the sulky, and I attain my object in the manner and by the means hereinafter set forth.

In the drawings accompanying and forming a part of this specification, Figure 1 is a plan of my device with the front ends of the shafts broken away and the wheels omitted. Fig. 2 is a rear view of the axle and spring. Fig. 3 is a plan of the shafts, axle, and truss-brace. Fig. 4 is a side view of a stirrup-bar; and Fig. 5 represents the under surface of a portion of shafts, showing the device used to connect the stirrups thereto.

The seat $a$ is attached to circle-bar $b$ and braced by bar $c$. (Shown by dotted lines in Fig. 1.) At each end of bar $b$ is a stirrup-bar having a loop for a foot and a slotted portion through which securing-bolts pass. On one side of the vehicle the loop is indicated by $d$, the slotted part by $e$, the securing-bolts by $g$, and the shafts by $h$. On the opposite side the loop is indicated by $d'$, the slotted part by $e'$, the securing-nuts by $g'$, and the shafts by $h'$. Bolts $f$ and $f'$ secure the stirrups to the shafts in a manner permitting free pivotal motion. The shafts are secured to the axle in the customary manner. The axle curves upward, as shown in Fig. 2. A curved truss-brace composed of bars $i\ k$ and struts $s\ s$ connects at its ends with the shafts. A clip $t$ connects the rear bar to the axle. The whiffletree $l$ is secured to the front bar. The spring comprises the reversely-curved approximately-horizontal portions $m$ and $o$, held together by clips $t\ t$, and the approximately-vertical parts $m'$ and $m''$, hinged to $m$ and secured to the axle by clips $q\ q'$. The ends $h$ of spring $o$ connect with circle-bar $b$ at or near the positions indicated by letters $p'\ p'$ in Fig. 1. The truss-brace imparts rigidity to the shafts, while permitting the seat to closely approach the horse. The curved axle provides against interference with the movements of the horse. The spring provides desirable elasticity, and the adjustable and pivoting stirrup-bars make the vehicle adaptable to different drivers and insure, when adjusted, a constant relation between the seat and feet-supports. The bearings for pivot-bolts $f\ f$ are preferably made as shown at $u$ in Fig. 5, and they are secured to the shaft by screws.

I claim as new and desire to secure by Letters Patent—

1. A two-wheeled vehicle comprising shafts, a curved axle, a truss-brace connecting the shafts and axle and carrying a whiffletree, a circle-bar carrying a seat over the axle and connecting pivotally with the shafts, and a spring on the axle under the circle-bar, as set forth.

2. A two-wheeled vehicle comprising shafts, a curved axle, a truss-brace connecting the shafts and axle and carrying a whiffletree, a circle-bar carrying the seat, a spring on the axle carrying the rear part of the circle-bar, and stirrup-bars longitudinally adjustable on the ends of the circle-bar and pivotally connected with the shafts, as set forth.

3. A two-wheeled vehicle comprising shafts $h\ h'$, curved axle $n$, truss-brace $i\ k\ s\ s$, connecting the shafts and axle and carrying whiffletree $l$, the circle-bar $b$, carrying seat $a$, the spring comprising parts $m,\ m',\ m''$, and $o$, supporting the circle-bar and seat from the axle, and the stirrup-bars having loops $d\ d'$ and slotted portions $e\ e'$, the said stirrup-bars being pivotally connected with the shafts and adjustably connected with the ends of the circle-bar, as set forth.

In testimony whereof I sign my name in the presence of two subscribing witnesses.

WM. J. WAYNE.

Attest:
GEO. D. RANDOLPH,
I. D. WALKER.